Nov. 8, 1927.
C. R. COLEMAN ET AL
1,648,474
AUTOMOBILE STAND
Filed Feb. 28, 1924
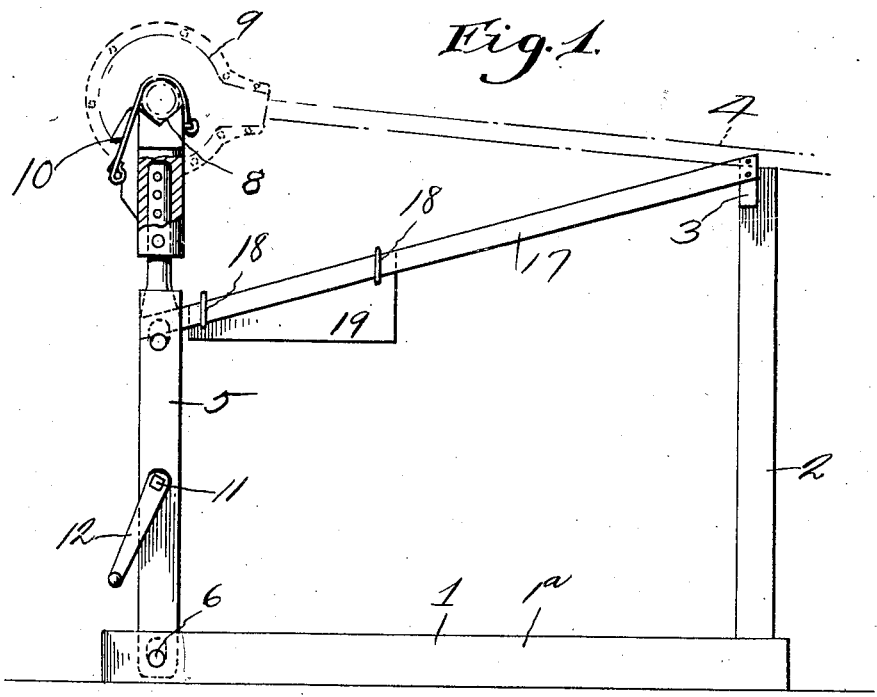
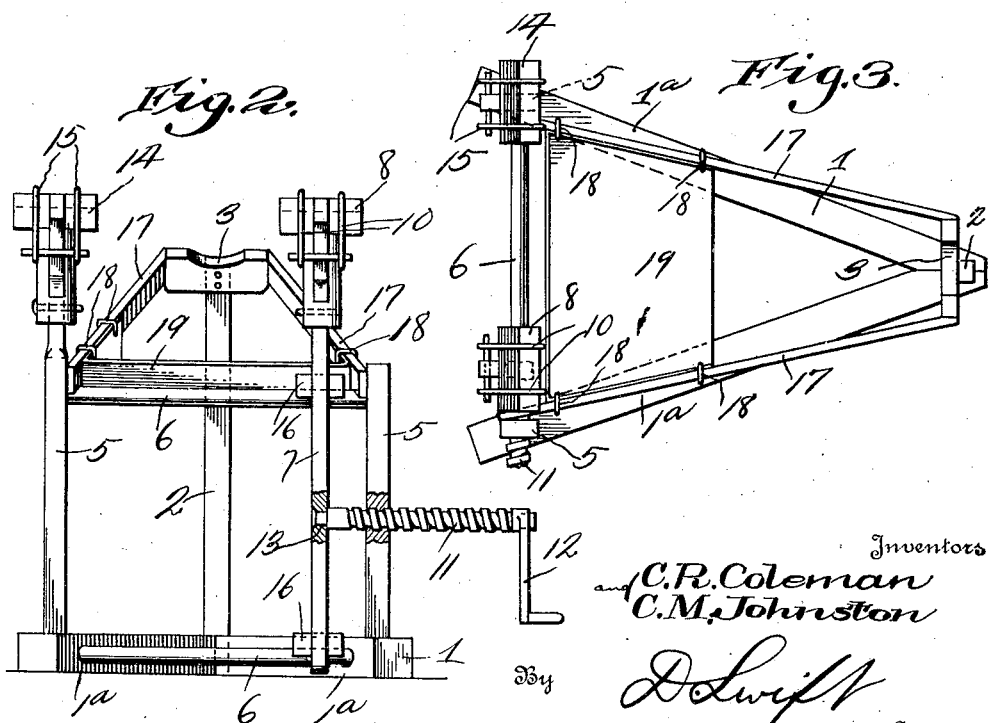
Inventors
C. R. Coleman
C. M. Johnston
By D. Swift
Attorney Patented Nov. 8, 1927.

1,648,474

UNITED STATES PATENT OFFICE.

CHARLES R. COLEMAN AND CLYDE M. JOHNSTON, OF BRASHEAR, MISSOURI.

AUTOMOBILE STAND.

Application filed February 28, 1924. Serial No. 695,756.

The invention relates to automobile stands, and has for its object to provide a device of this character on which the rear end of an automobile may be supported, particularly while working on the differential thereof.

A further object is to provide the stand with upwardly extending members adapted to engage the differential casing, and one of said members is laterally adjustable for moving a section of the differential casing axially for exposing the differential gearing.

A further object is to provide securing clamps carried by the upwardly extending members for securely attaching said members to the differential casing section.

A further object is to provide the stand with a tray for the reception of tools and the like and parts of the differential during the assembling or disassembling of the differential.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of the stand.

Figure 2 is a rear view of the stand.

Figure 3 is a top plan view of the stand.

Referring to the drawing, the numeral 1 designates the base of the stand, which base is substantially triangular shaped and has its forward end provided with an upwardly extending bar 2, the upper end of which is provided with a recess block 3 adapted to engage the crank shaft 4 of the automobile. Extending upwardly from the rear ends of the diverging bars 1ᵃ of the base are supports 5, which supports are connected together by spaced bars 6. Slidably mounted on said bars is a vertically disposed laterally movable bar 7, the upper end of which is provided with a recess block 8, in which is received the axial casing to one side of the differential 9 of the automobile, and which casing is securely clamped to the recess block by means of a clamp 10, whereby a section of the differential casing will be moved outwardly upon a lateral outward movement of the bar 7 when the operating screw 11 is rotated by the crank 12. Operating screw 11 is threaded through one of the supports 5 and is pivotally connected at 13 to the bar 7, consequently when the operating screw 11 is rotated a section of the differential casing 9 to which the bar 7 is connected by the clamping member 10, will be axially moved in the direction of the movement of the bar 7. The support 5 at one side of the device is provided with an axle engaging block 14, in which the axle casing of the automobile is received and held by means of clamps 15, consequently the section of the differential casing carried by said last named support will be held against movement during the lateral movement of the bar 7, therefore the differential casing section may be easily and quickly separated or forced together. To insure a positive sliding of the bar 7 on the guide shafts 6, said bar is provided with concave bearing blocks 16, which engage the upper sides of the shaft 6 and are relatively long, and consequently provide wide bearing surfaces on the shafts 6 and insure a positive sliding of the bar 7.

Supported between the side bars 17 by means of hooks 18 is a tray 19, in which tray tools may be placed while working on the differential, or parts of the differential, therefore it will be seen that the operator will have all tools and parts within easy reach while working on the differential.

From the above, it will be seen that an automobile stand is provided on which an automobile may be supported, and the differential casing sections separated thereby allowing the operator to repair the differential. It will also be seen that the device may be operated by a single person, thereby reducing the cost to a minimum when it is necessary to repair a differential. The automobile may be placed on the stand in any suitable manner, for instance by jacking the rear end in the usual manner and pushing the stand under the rear end of the automobile, after which the automobile may be lowered onto the stand.

The invention having been set forth what is claimed as new and useful is:—

The combination in an automobile supporting stand, a base for said stand, said stand having a fixed axle engaging member adapted to engage an axle casing at one side of the differential, spaced transversely disposed parallel bars, an axle engaging member adapted to engage the axle casing at the other side of the differential and adjustable towards and away from the first mentioned axle engaging member without varying the width of the base, said adjustable member comprising a vertically disposed bar, said vertically disposed bar being slidably mounted on the spaced transversely disposed parallel bars, an operating screw pivoted to said vertically disposed bar, a vertically disposed stationary support, said operating screw being threaded through said vertically disposed stationary support.

In testimony whereof we have signed our names to this specification.

CHARLES R. COLEMAN.
CLYDE M. JOHNSTON.